(12) United States Patent
Persaud et al.

(10) Patent No.: US 11,924,703 B2
(45) Date of Patent: Mar. 5, 2024

(54) ONE OR MORE REMOTE MODEMS CONNECTED TO ANTENNA CIRCUITRY BY ANALOG CABLING AND CONNECTED TO CONTROL CIRCUITRY THAT CONTROLS BEHAVIOUR OF THE ONE OR MORE REMOTE MODEMS BY DIGITAL CABLING

(71) Applicant: AIRSPAN IP HOLDCO LLC, Boca Raton, FL (US)

(72) Inventors: Marlon Peter Persaud, Beaconsfield (GB); Andrew Logothetis, High Wycombe (GB); Krzysztof Dudzinski, Langley (GB); Venkateswarlu Katepalli, Slough (GB); Ashvtosh Goel, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

(21) Appl. No.: 16/828,821

(22) Filed: Mar. 24, 2020

(65) Prior Publication Data

US 2020/0328939 A1    Oct. 15, 2020

(30) Foreign Application Priority Data

Apr. 12, 2019  (GB) ..................................... 1905222
Mar. 3, 2020   (GB) ..................................... 2003024

(51) Int. Cl.
*H04W 36/30*     (2009.01)
*H04B 17/309*    (2015.01)
(Continued)

(52) U.S. Cl.
CPC .......... *H04W 36/30* (2013.01); *H04B 17/309* (2015.01); *H04L 5/001* (2013.01);
(Continued)

(58) Field of Classification Search
CPC .............................. H04L 12/24; H04W 36/30
See application file for complete search history.

(56) References Cited

U.S. PATENT DOCUMENTS 6,211,926 B1   4/2001  Won
7,180,876 B1   2/2007  Henry et al.
(Continued)

FOREIGN PATENT DOCUMENTS

EP   2373111 A1   10/2011
EP   2991403 A2    3/2016
(Continued)

OTHER PUBLICATIONS

U.S. Office Action in U.S. Appl. No. 16/827,970 dated Jan. 13, 2021, 60 pages.
(Continued)

*Primary Examiner* — Sulaiman Nooristany
(74) *Attorney, Agent, or Firm* — Haynes Beffel & Wolfeld, LLP; Andrew L. Dunlap (57) ABSTRACT

There is provided a network comprising antenna circuitry to receive incoming signals and transmit outgoing signals. Remote modem circuitry, connected to the antenna circuitry by analog cabling, demodulates a first incoming signal of the incoming signals to produce first incoming data and control circuitry, remote from the remote modem circuitry and connected to the remote modem circuitry via digital cabling, controls a behaviour of the remote modem circuitry and receives the first incoming data from the remote modem circuitry.

14 Claims, 10 Drawing Sheets

(51) Int. Cl.
    *H04L 5/00*   (2006.01)
    *H04W 24/08*  (2009.01)
    *H04B 7/185*    (2006.01)
    *H04B 17/10*    (2015.01)
    *H04B 17/12*    (2015.01)
    *H04B 17/18*    (2015.01)
    *H04L 41/0803*  (2022.01)
    *H04W 16/10*    (2009.01)
    *H04W 24/02*    (2009.01)
    *H04W 24/10*    (2009.01)
    *H04W 72/0453*  (2023.01)
    *H04W 72/23*    (2023.01)
    *H04W 72/541*   (2023.01)
    *H04W 72/542*   (2023.01)
    *H04W 76/10*    (2018.01)

(52) U.S. Cl.
    CPC ......... *H04W 24/08* (2013.01); *H04B 7/18504* (2013.01); *H04B 17/101* (2015.01); *H04B 17/12* (2015.01); *H04B 17/18* (2015.01); *H04L 41/0803* (2013.01); *H04W 16/10* (2013.01); *H04W 24/02* (2013.01); *H04W 24/10* (2013.01); *H04W 72/0453* (2013.01); *H04W 72/23* (2023.01); *H04W 72/541* (2023.01); *H04W 72/542* (2023.01); *H04W 76/10* (2018.02)

(56) References Cited

U.S. PATENT DOCUMENTS

| | | | |
|---|---|---|---|
| 10,085,266 | B1 | 9/2018 | Pawar et al. |
| 10,693,557 | B1* | 6/2020 | Ayotte ................ H04B 10/116 |
| 11,146,448 | B2 | 10/2021 | Persaud et al. |
| 2006/0229104 | A1 | 10/2006 | de La Chapelle et al. |
| 2007/0165526 | A1 | 7/2007 | Lee |
| 2009/0047971 | A1 | 2/2009 | Fu |
| 2009/0096857 | A1* | 4/2009 | Frisco ................ H04N 21/2146 348/14.02 |
| 2009/0191877 | A1 | 7/2009 | Jang et al. |
| 2009/0221302 | A1 | 9/2009 | Luiro et al. |
| 2009/0264128 | A1 | 10/2009 | Tomisawa |
| 2009/0318138 | A1 | 12/2009 | Zeng et al. |
| 2010/0197317 | A1 | 8/2010 | Sadek et al. |
| 2010/0329200 | A1 | 12/2010 | Chen et al. |
| 2011/0026476 | A1 | 2/2011 | Lee et al. |
| 2012/0042345 | A1* | 2/2012 | Tjio ................ H04L 12/2834 725/63 |
| 2012/0263117 | A1 | 10/2012 | Love et al. |
| 2013/0109401 | A1 | 5/2013 | Ma et al. |
| 2013/0182655 | A1 | 7/2013 | Das et al. |
| 2014/0086155 | A1 | 3/2014 | Chen |
| 2014/0094165 | A1 | 4/2014 | Karlsson et al. |
| 2014/0126498 | A1 | 5/2014 | Koorapaty et al. |
| 2015/0050941 | A1 | 2/2015 | Sawada et al. |
| 2015/0172987 | A1 | 6/2015 | Balakrishnan et al. |
| 2015/0245218 | A1 | 8/2015 | Hassan et al. |
| 2015/0256314 | A1 | 9/2015 | Gauvreau et al. |
| 2015/0280806 | A1 | 10/2015 | Jalali |
| 2015/0341945 | A1 | 11/2015 | Panchal |
| 2015/0358070 | A1* | 12/2015 | Ohm .................... H04B 7/0608 370/329 |
| 2016/0014657 | A1* | 1/2016 | Le ...................... H04B 7/18506 455/436 |
| 2016/0262065 | A1 | 9/2016 | Axmon |
| 2017/0048863 | A1 | 2/2017 | Tsai et al. |
| 2018/0014269 | A1* | 1/2018 | Lauer .................. H04W 60/04 |
| 2018/0035416 | A1 | 2/2018 | Yi et al. |
| 2018/0063736 | A1 | 3/2018 | Sadeghi et al. |
| 2018/0070280 | A1 | 3/2018 | Nittala et al. |
| 2018/0084562 | A1 | 3/2018 | Ramamurthi et al. |
| 2018/0192327 | A1 | 7/2018 | Gaydos et al. |
| 2018/0206133 | A1 | 7/2018 | Venkatraman et al. |
| 2019/0281441 | A1 | 9/2019 | Huang et al. |
| 2019/0319723 | A1 | 10/2019 | Axmon et al. |
| 2019/0327631 | A1 | 10/2019 | Huang et al. |
| 2020/0092685 | A1 | 3/2020 | Fehrenbach et al. |
| 2020/0186237 | A1* | 6/2020 | Karlsson .............. H04W 84/06 |

FOREIGN PATENT DOCUMENTS

| | | |
|---|---|---|
| EP | 3062446 A1 | 8/2016 |
| EP | 3167654 A1 | 5/2017 |
| EP | 3346784 A1 | 7/2018 |
| EP | 3387861 A1 | 10/2018 |
| WO | 2016007295 A1 | 1/2016 |
| WO | 2017097997 A1 | 6/2017 |
| WO | 2018210945 A1 | 11/2018 |

OTHER PUBLICATIONS

U.S. Office Action in U.S. Appl. No. 16/827,970 dated Sep. 28, 2020, 49 pages.
U.S. Office Action in U.S. Appl. No. 16/836,638 dated Oct. 29, 2021, 17 pages.
Dictionary.com definition for "configuration", Jan. 5, 2021, 1 page
EP Search Report from EP20166798.7 dated Aug. 28, 2020, 8 pages.
EP Search Report from EP20166810.0 dated Sep. 1, 2020, 7 pages.
GB Search Report from GB1915033.3 dated Apr. 1, 2020, 4 pages.
GB Search Report from GB2003168.8 dated Aug. 5, 2020, 5 pages.
GB Search Report from GB2003024.3 dated Nov. 13, 2020, 4 pages.
U.S. Office Action in U.S. Appl. No. 16/836,711 dated Jun. 10, 2021, 12 pages.
U.S. Appl. No. 16/827,970 Notice of Allowance, dated May 27, 2021, 13 pages.
U.S. Appl. No. 16/827,970 Notice of Allowance, dated Aug. 5, 2021, 21 pages.
U.S. Appl. No. 16,836,711 Notice of Allowance, dated Sep. 21, 2021, 12 pages.
U.S. Appl. No. 16/836,711 Notice of Allowance, dated Jan. 26, 2021, 7 pages.
EP Exam Report from EP20166810.0 dated May 24, 2022, 5 pages.
GB 2nd Exam Report from GB2003024.3 dated Sep. 1, 2022, 7 pages.
GB Exam Report from GB1915033.3 dated Jul. 25, 2022, 4 pages.
GB Second Exam Report from GB2003168.8 dated Aug. 23, 2022, 4 pages.
GB Exam Report from GB2003024.3 dated Apr. 11, 2022, 5 pages.

* cited by examiner

ONE OR MORE REMOTE MODEMS CONNECTED TO ANTENNA CIRCUITRY BY ANALOG CABLING AND CONNECTED TO CONTROL CIRCUITRY THAT CONTROLS BEHAVIOUR OF THE ONE OR MORE REMOTE MODEMS BY DIGITAL CABLING

The present technique relates to networking and can have relevance to data processing within networks.

Modem circuitry is used to demodulate a signal into data and/or modulate data into a signal. In, for instance, a vehicle, significant signal loss can be experienced between the antenna and the modem. In particular, ducting that is used to provide infrastructure to cabling can be long, leading to significant path loss. Although this can be ameliorated by increasing the shielding surrounding the cabling, this leads to much larger cabling. Since ducting space is limited, this places heavy restrictions on the size and number of cables, which limits the capabilities of the underlying network.

Viewed from a first example configuration, there is provided antenna circuitry to receive incoming signals and transmit outgoing signals; remote modem circuitry, connected to the antenna circuitry by analog cabling, to demodulate a first incoming signal of the incoming signals to produce first incoming data; and control circuitry, remote from the remote modem circuitry and connected to the remote modem circuitry via digital cabling to control a behaviour of the remote modem circuitry and to receive the first incoming data from the remote modem circuitry.

Viewed from a second example configuration, there is provided an apparatus comprising: antenna circuitry; slave modem circuitry to receive data from a plurality of base stations during a plurality of frames; master modem circuitry to communicate with at most one of the plurality of base stations during the plurality of frames; and switching circuitry to switch the one of the plurality of base stations to a new one of the plurality of base stations in response to a condition.

Viewed from a third example configuration, there is provided a method comprising: receiving incoming signals and transmitting outgoing signals via antenna circuitry; using remote modem circuitry, connected to the antenna circuitry by analog cabling, to demodulate a first incoming signal of the incoming signals to produce first incoming data; and using control circuitry, remote from the remote modem circuitry and connected to the remote modem circuitry via digital cabling to control a behaviour of the remote modem circuitry and to receive the first incoming data from the remote modem circuitry.

Viewed from a fourth example configuration, there is provided receiving data from a plurality of base stations at slave modem circuitry during a plurality of frames; communicating with at most one of the plurality of base stations at master modem circuitry during the plurality of frames; and switching circuitry to switch the one of the plurality of base stations to a new one of the plurality of base stations in response to a condition.

The present technique will be described further, by way of example only, with reference to embodiments thereof as illustrated in the accompanying drawings, in which.

Before discussing the embodiments with reference to the accompanying figures, the following description of embodiments and associated advantages is provided.

In accordance with some example embodiments there is provided antenna circuitry to receive incoming signals and transmit outgoing signals; remote modem circuitry, connected to the antenna circuitry by analog cabling, to demodulate a first incoming signal of the incoming signals to produce first incoming data; and control circuitry, remote from the remote modem circuitry and connected to the remote modem circuitry via digital cabling to control a behaviour of the remote modem circuitry and to receive the first incoming data from the remote modem circuitry.

The remote modem circuitry, which is remote from the control circuitry, is connected to the antenna circuitry by analog cabling such as RF cabling. The remote modem circuitry demodulates a first incoming signal that is received via the antenna circuitry. The demodulated signal is thereby converted into incoming data, which is provided to the control circuitry via digital cabling such as PCIe, optical cable, Ethernet, etc. Since the digital cabling need not carry the RF signal, and need only provide digital data, the attenuation, as well as the number of cables, can be significantly reduced. By providing the remote modem circuitry in this manner, it is possible to reduce the amount of cabling that must be provided. Furthermore, the need for signal boosting capability or attenuation limiting capability is reduced. This can therefore limit the extent to which cabling is necessary and can limit the size of such cabling.

In some examples, the remote modem circuitry is nearer to the antenna circuitry than the control circuitry. Consequently, the amount of cabling that would be necessary if analog cabling would have to be provided all the way to the control circuitry can be reduced.

In some examples, a length of the analog cabling is less than a length of the digital cabling. Effectively, the digital cabling takes the place of the analog cabling, and so by reducing the analog cabling, the amount of signal loss that occurs can be kept small.

In some examples, the remote modem circuitry is adapted to modulate outgoing data to produce a first outgoing signal of the outgoing signals. The remote modem circuitry could therefore operate in such a manner as to transmit data via the antenna circuitry, as well as to receive data. In some other examples, the remote modem circuitry is only capable of receiving data and has no transmission capability.

In some examples, the network comprises further modem circuitry to demodulate a second incoming signal of the incoming signals to produce second incoming data and to provide the second incoming data to the control circuitry, wherein the control circuitry is adapted to control a behaviour of the further modem circuitry. The second incoming signal may be different to the first incoming signal, so that each of the remote modem circuitry and the further modem circuitry demodulates different signals. In such examples, this makes it possible for the network to process signals from sources of signals other than those that are in use. For instance, if the network is actively engaged in exchanging data with a base station that is the source of the first incoming signal, then the remote modem circuitry can demodulate these signals while data from another base stations that is the source of the second incoming signal can be demodulated by the further modem circuitry.

In some examples, the further modem circuitry is adapted to modulate second outgoing data to produce a second outgoing signal of the outgoing signals. The further modem circuitry may therefore be capable of performing transmission using the antenna circuitry.

In some examples, the network comprises beamforming circuitry to perform beamforming using the modem circuitry and the further modem circuitry. Beamforming is a technique in which RF signals are coherently combined in order to increase the power of an overall signal and therefore increase the ability to transmit or receive that signal. In such examples, the same data may be modulated and transmitted as both a first signal and a second signal using different antennas in the antenna circuitry. Coherent combining produces a resulting signal, which has a higher power and therefore is capable of greater transmission distances than the first signal and the second signal. In addition, beamforming suppresses interfering signals arriving from directions away from the focusing angle. This technique makes it possible for an array of multiple antennas to effectively be "combined" in order steer a beam, providing wireless connectivity across larger distances than the individual antennas (in isolation) are capable.

In some examples, the control circuitry comprises the further modem circuitry. In some other examples, the further modem circuitry is further remote modem circuitry; and the further remote modem circuitry is nearer to the antenna circuitry than the control circuitry.

In some examples, the antenna circuitry comprises a first antenna array and a second antenna array; the remote modem circuitry is connected to the first antenna array; the further modem circuitry is connected to the second antenna array. In such examples, each of the first antenna array and the second antenna array may operate independently. Furthermore, beamforming, as previously described, can take place within each antenna array as well as between the antenna arrays. That is to say that the antennas within an antenna array could utilise beamforming. Furthermore, the antenna arrays themselves could collectively co-operate to perform beamforming. By providing multiple antenna arrays, it is possible to take advantage of antenna directionality, e.g. by propagating or receiving a signal in multiple directions.

In some examples, the first incoming signal originates from a first base station; the second incoming signal originates from a second base station; the control circuitry is adapted to perform a comparison between the first incoming signal and the second incoming signal; and the control circuitry is adapted to cause the remote modem circuitry to communicate with the second base station in place of the first base station in dependence on a result of the comparison. In this way, the further modem circuitry can be used to judge whether there is a better base station with which the modem circuitry can be communicating. This analysis can be performed without disconnecting from, or devoting significant resource of the remote modem circuitry to scanning, demodulating, and analysing the signals of other base stations. Instead, this work can be offloaded to the further modem circuitry, which provides data to the control circuitry. From there, the control circuitry can decide whether to control the remote modem circuitry to receive data from a different base station. Such a system is therefore able to use the most appropriate signal without significant loss of resource. Furthermore, since the remote modem circuitry is remote from the control circuitry, it is possible to use the most appropriate signal without a large amount of analog cabling being required in order to connect multiple modems to antennas.

There are a number of ways that the comparison can be performed. However, in some examples, the comparison considers a signal strength of the first incoming signal and the second incoming signal. Here, the term "signal strength" does not necessarily refer to a raw power measurement of the signal, but could instead be a signal-to-noise ratio (SNR), a signal-to-interference-and-noise ratio (SINR), etc.

In some examples, the comparison considers a change in signal strength of the first incoming signal and the second incoming signal. Such examples could therefore consider whether the strength of one of the signals (which, as explained above, could be an SNR or SINR, for instance) increases over time as compared to the other signal. A signal whose "signal strength" increases over time could correspond to a base station that is coming closer to the antenna. Where several signals increase in strength over time, it might be appropriate to use the signal that grows in strength the quickest, since this could be expected to lead to a stronger signal. Alternatively, in other examples, it could be assumed that a signal that grows in strength slowly will (when the base station has passed) decrease is strength slowly and consequently, such a signal could be selected in order to minimise changes between base stations.

In some examples, there is provided a vehicle comprising one of the above-mentioned networks. In these examples, the antenna circuitry is external to the vehicle; and the control circuitry is internal to the vehicle. Vehicles such as aircraft can face extensive restrictions or regulations regarding where particular electrical components can be placed within the vehicle. For instance, regulations may prohibit the placement of actively electrical components near the fuel tanks, or may require that cabling travels through specific ducting to reach the inside of the aircraft. Such ducting could be confined and could substantially increase the length of any cabling required, which could be problematic if attenuation due to cabling length occurs. In such examples, the remote modem circuitry is placed outside the vehicle, where fewer restrictions may apply. Digital cabling can then be used to provide the demodulated signals to the control circuitry inside the vehicle.

In some examples, the remote modem circuitry is external to the vehicle. With both the antenna circuitry and the remote modem circuitry being provided outside the vehicle and in close proximity, the amount of cabling (which can be subject to attenuation) can be limited. Digital cabling, which is typically less prone to attenuation, and hence can be made smaller, can then be used to carry the demodulated signal. This therefore reduces both signal loss and the amount of cabling needed.

In accordance with some example embodiments there is provided an apparatus comprising: antenna circuitry; slave modem circuitry to receive data from a plurality of base stations during a plurality of frames; master modem circuitry to communicate with at most one of the plurality of base stations during the plurality of frames; and switching circuitry to switch the one of the plurality of base stations to a new one of the plurality of base stations in response to a condition.

In these embodiments, the master modem circuitry is able to maintain a connection to a specific (one) base station. During that time, the full set of signals that are received from different base stations are received by slave modem circuits. Consequently, analysis on the full set of signals can be made by the slave modem circuitry without needing to disconnect the master modem circuitry from its base station. Fast switching of the connected base station can therefore take place while reducing disconnection times. Note that such an apparatus may take the form of any of the networks previously described, with analog cabling being used to connect the antenna circuitry to the slave and master modem circuitry and then digital cabling being used to connect the slave and master modem circuitry to the switching circuitry. Such a network is able to take advantage of the placement of the modem circuitry as well as the use of digital cabling to reduce the amount of cabling that would otherwise be needed and thereby provide slave modem circuitry. In previously proposed systems, the amount of cabling required would typically inhibit the ability to provide slave modem circuitry.

In some embodiments, the condition comprises a requirement that the new one of the plurality of base stations provides a stronger signal than the one of the plurality of base stations.

Particular embodiments will now be described with reference to the figures.

Figure 1A:
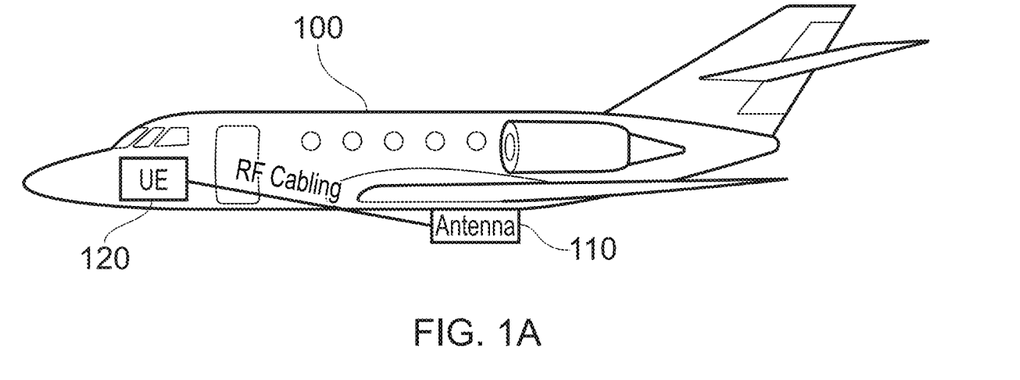
FIG. 1A illustrates a vehicle in the form of an aircraft and FIG. 1B illustrates the same network schematically.

FIG. 1A illustrates a vehicle 100 in the form of an aircraft. The aircraft contains wireless communication capability by providing an antenna array or antenna assembly 110. In order to reduce attenuation of wireless signals, the antenna is mounted on an exterior of the aircraft. The antenna is connected to User Equipment (UE) 120 in the form of a modem via RF cabling, which is an example of an analog cable. The UE is located inside the aircraft in order to protect it from the local environment (e.g. weather).

Figure 1B:
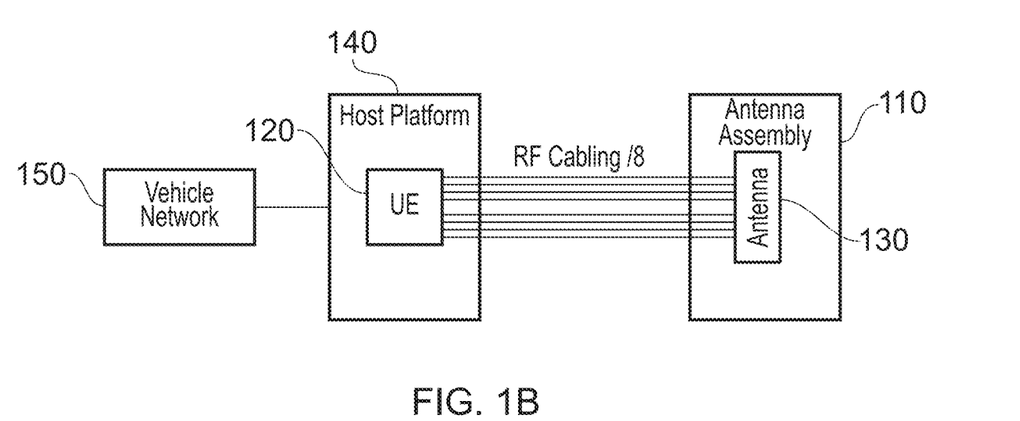

FIG. 1B illustrates the same network schematically. The UE 120 is connected to an antenna 130 of the antenna assembly 110 via RF cabling. In this particular example, eight RF cables are provided, which is one of several common configurations. The UE 120 forms part of a host platform 140, which may contain additional functionality, such as to control the UE 120. In addition, data can be passed between the UE 120 of the host platform 140 and a vehicle network 150, which may allow other devices to connect and share data.

Due to an RF signal being transmitted between the antenna 130 and the UE 120, signal loss occurs on the RF cabling. It is therefore necessary to use heavily shielded cables, which are large (e.g. they have a large width). This problem is exacerbated by the fact that to provide a cable from outside the aircraft to inside the aircraft can require running cables through especially designed ducting. Such ducting can take indirect paths in order to avoid critical systems such as fuel tanks. The length of such cabling is therefore often long and this worsens the signal loss, requiring even bigger cables. This, in turn, increases the cost of the cables. Furthermore, the ducting space is limited, and this limits the number of RF cables that can be provided, which also limits the wireless communication capability.

Figure 2:
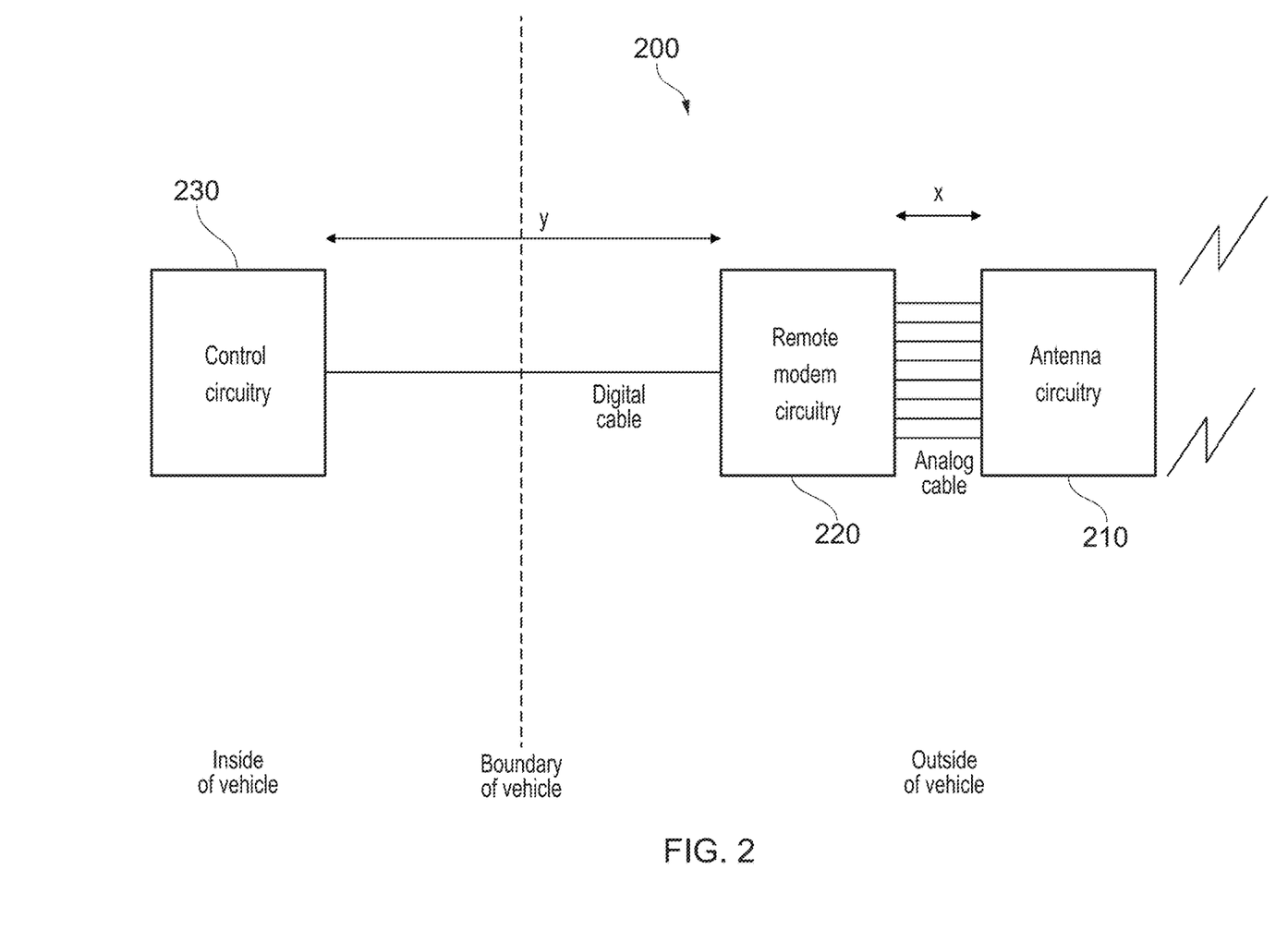
FIG. 2 schematically illustrates a network in accordance with some embodiments.

FIG. 2 schematically illustrates a network 200 in accordance with some embodiments. The network is split across the boundary of a vehicle such that part of the network 200 is outside the vehicle and part of the network is inside the vehicle. In this example, the remote modem circuitry 220 and antenna circuitry 210 are outside the vehicle while the control circuitry 230 is inside the vehicle. In this example, the antenna circuitry 210 receives a number of wireless signals. These are then passed, via analog cables (e.g. RF cables) to remote modem circuitry 220 where the signal is demodulated. The data that results from the demodulation is passed to the control circuitry 230 via a digital cable. In this example, the distance (x) between the antenna circuitry 210 and the remote modem circuitry 220 is much shorter than the distance (y) between the remote modem circuitry 220 and the control circuitry 230. Similarly, the length of the analog cable is shorter than the length of the digital cable. Since signal loss is significantly less (per metre) in the digital cable than in the analog cable, the placement of the remote modem circuitry 220 near to the antenna circuitry 210 and the use of longer digital cable means that not only can eight RF cables be replaced by a single digital cable, but also that the digital cable can be made much smaller (e.g. less wide) than the RF cables due to less shielding being needed.

There are a number of ways in which the modem circuitry can be distributed in the network. In particular, the replacement of analog cables with digital cables makes it possible to increase the amount of modem circuitry while using comparatively less of the ducting for cabling. The modem circuitry can also be divided into different types of modem circuit, each of which might have different functionality.

Figure 3A:
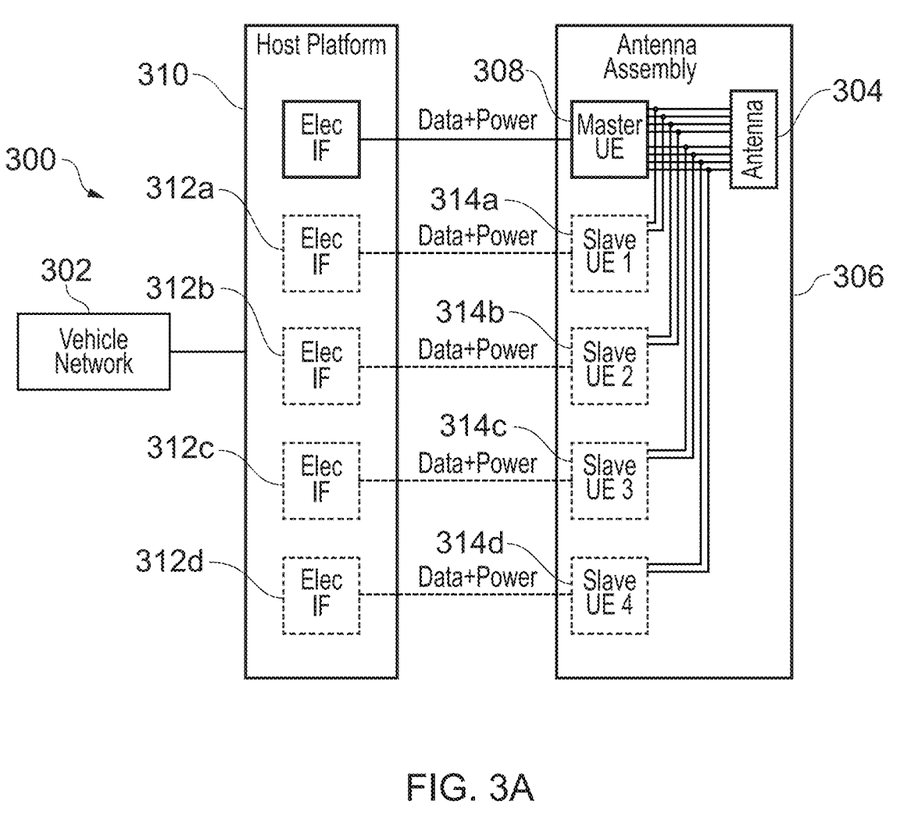
FIG. 3A illustrates an example network in accordance with some embodiments.

FIG. 3A illustrates an example network 300 in accordance with some embodiments in which the antenna assembly 306 contains an antenna 304 as well as a number of modems 308, 314a, 314b, 314c, 314d in the form of a master UE 308 and four slave modems 314a, 314b, 314c, 314d. Each of the slave modems is configured to only receive wireless signals from the antenna 304 and not to transmit any signals. Consequently, only two analog cables are required to connect each slave modem 314a, 314b, 314c, 314d to the antenna. The master is capable of receiving and transmitting and hence uses a full eight analog cables. Each of the modems 308, 314a, 314b, 314c, 314d is connected to an electronic interface 312a, 312b, 312c, 312d of a host platform 310 via a digital cable. The host platform acts as control circuitry for each of the modems 308, 314a, 314b, 314c, 314d and is capable of controlling the modems (e.g. to indicate which signals should be demultiplexed). The host platform is connected to a vehicle network 302 so that other devices can receive and transmit data via the host platform 310.

The multiple slave modems 314a, 314b, 314c, 314d could be used in order to search for base stations. In particular, by each receiving and demodulating different incoming signals that are received by the antenna, it is possible to search for the most appropriate base station for communication to take place with. The host platform 310 can judge which signal is most indicative of the best base station to connect to, and can then cause the master 308 to connect to that base station for the purposes of receiving and transmitting real data. In this way, improvements in connectivity can be made without having to disconnect the master modem 308.

Figure 3B:
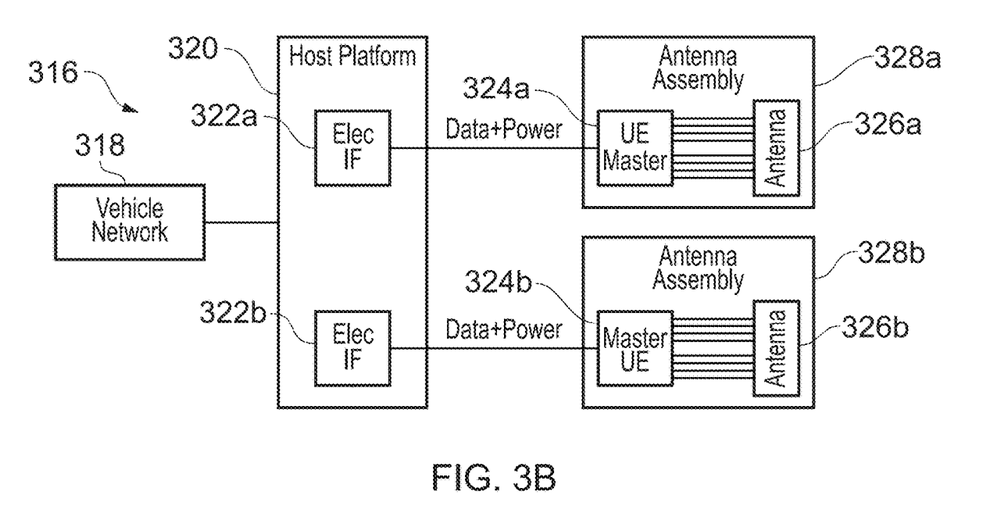
FIG. 3B illustrates another example network in accordance with some embodiments.

FIG. 3B illustrates another example network 316 in accordance with some embodiments in which the antenna circuitry includes two different assemblies 328a, 328b, each with its own antenna 326a, 326b. Each antenna assembly 328a, 328b also includes a master modem 324a 324b. Again, eight analog cables are used to connect each master 324a, 324b to its antenna 326a, 326b. Each master 324a, 324b is also connected to the host platform 320 via an electronic interface 322a, 322b, with the host platform being connected to a vehicle network 318. In this example, it is possible for the host platform to determine which master modem 324a, 324b has the best connection and to cause data to be sent to and/or received from that master modem 324a, 324b. The other of the masters 324a, 324b can be used to search for a next base station with which to form a connection. In this way, the two master modems 324a, 324b can effectively form a rolling connection, with one of the masters 324a, 324b connecting to a "most recent" base station and the other of the two masters 324a, 324b searching for a "next" base station.

Figure 3C:
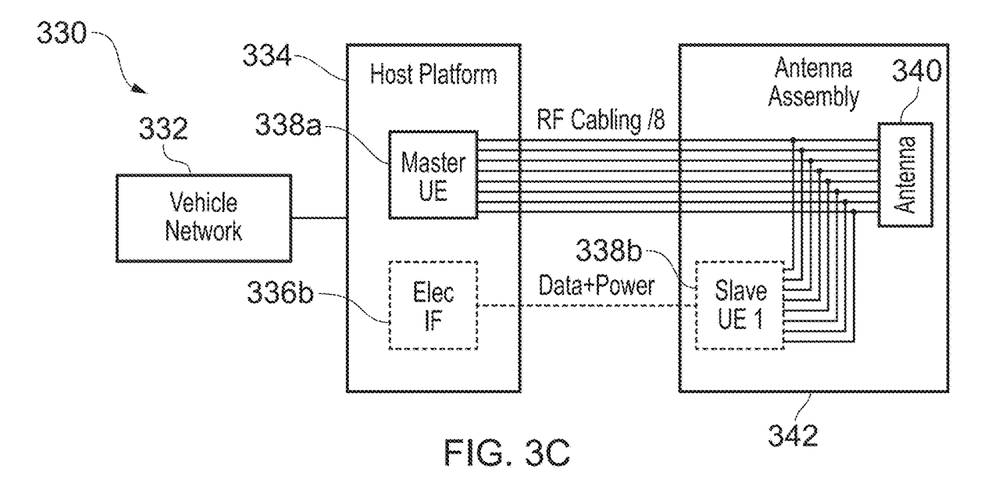
FIG. 3C illustrates another example network in accordance with some embodiments.

FIG. 3C illustrates another example network 330 in accordance with some embodiments in which a single antenna 340 is connected via eight analog cables to a master modem 338a in the host platform 334. In addition, the analog cables are also used to provide a slave modem 338b in the antenna assembly 342 with access to the antenna 340. The slave modem 338b is connected to an electronic interface 336b in the host platform 344 via a digital cable. The host platform 334 is connected to a vehicle network 332. Here, the slave modem 338b has full access to the antenna, being connected to the antenna via the full eight analog cables.

In each of the above examples, modem circuitry is located within the antenna assembly. This makes it possible to vastly reduce the length of any analog cabling. Indeed, such cabling can be reduced to the size of circuit pathways (e.g. centimetres or even smaller). However, this is not obligatory, and the modem circuitry can be located outside the antenna assembly. Indeed, in some cases, it may be possible to place some of the modem circuitry inside the host platform 334, such as in FIG. 3C.

Figure 4:
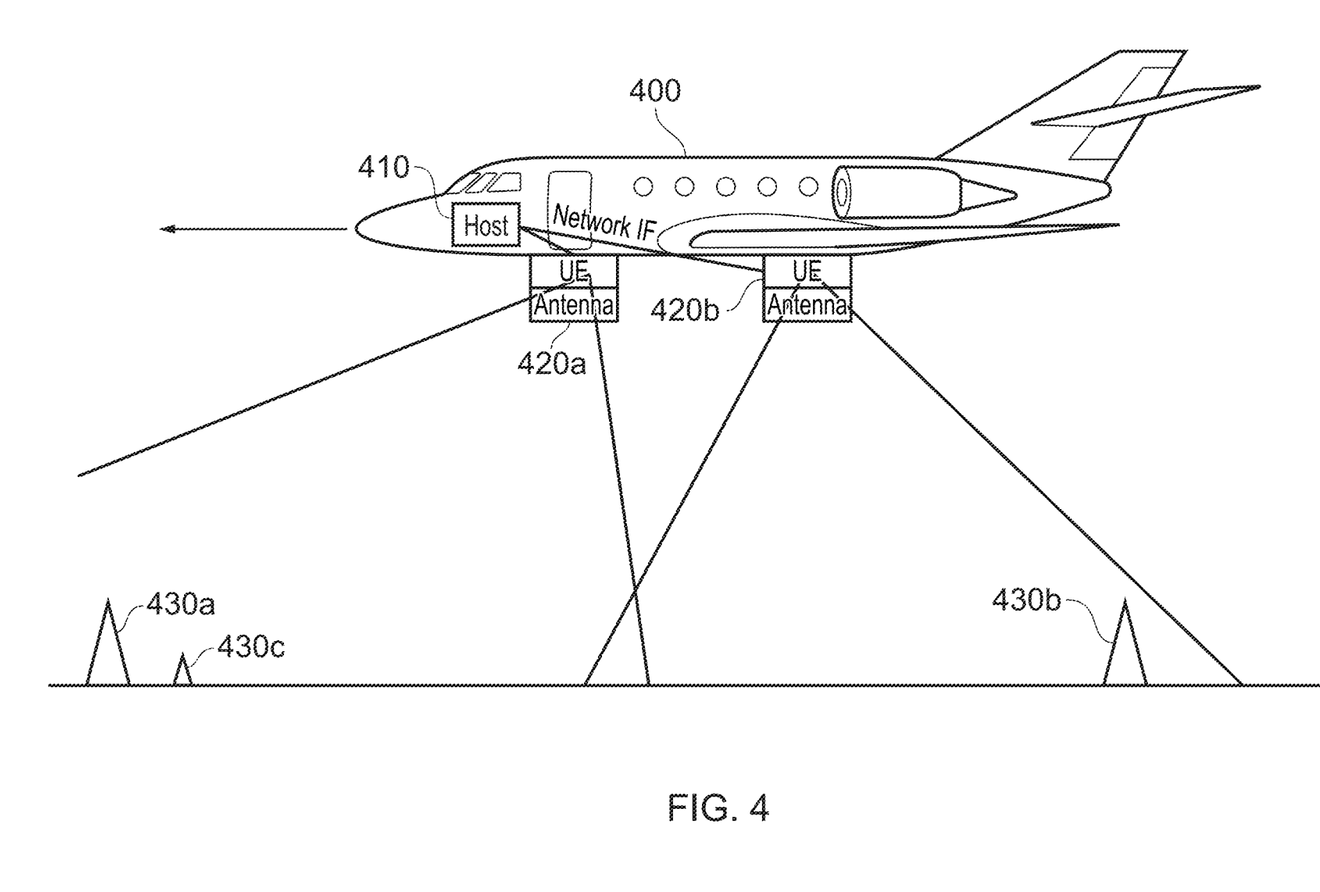
FIG. 4 illustrates another way in which the network of FIG. 3B, for instance, can be used, in accordance with some embodiments.

FIG. 4 illustrates another way in which the network of FIG. 3B, for instance, can be used. In this example, a vehicle 400 in the form of an aircraft is provided with a host platform 410. This connects to a pair of master modems/ antennas 420a, 420b. The master modems/antennas 420a, 420b are located such that one 420a is towards the front of the aircraft and the other 420b is towards the rear of the aircraft. In this example, a first base station 430a is within the range of the forward master modem/antenna 420a and a second base station 430b is within the range of a second master modem/antenna 420b. As the aircraft continues to move (e.g. in the direction of the arrow shown in FIG. 4), the second base station 430b will fall outside the range of the rear master modem/antenna 420b and communication with that base station will cease to be possible. At a similar time, the first base station 430a will come into range of the second master modem/antenna 420b so that a connection can be established. Shortly after that time, the same base station 430a will fall outside the range of the first master modem/ antenna 420a. However, the connection can be maintained, since the base station 430a remains in range of the second master modem/antenna 420b. This frees up the first master base station/antenna 420a to connect to another base station (not shown) should one come into range. In this way, connectivity can be maintained and searches for new base stations can be made without having to disconnect the current connection.

In this example, another base station 430c is shown. If the position of this third base station 430c is such that it will come into range of the forward master modem/antenna 420a at the same time as the first base station 430a, then the host platform 410 will need to make a decision of which base station 430a, 430c should be used. In such a scenario, the host circuitry may based its decision on the signal strength (e.g. SINR) of each signal received from the base stations 430a, 430c. In some examples, the trajectory of the vehicle may be such that the signal strengths are changing at different rates. In these examples, the host platform 410 may decide to connect to a base station whose signal strength is increasing the fastest on the basis that it will rapidly turn into a strong connection. Alternatively, e.g. if the signal strength is strong, and decreasing very slowly, the host platform 410 may decide to not connect to a base station whose signal is growing rapidly, on the assumption that the signal will decrease just as rapidly when the vehicle passes over the base station.

It will also be appreciated that although this example only uses modems in a forward and backward direction, it is possible to extend this principle to cover a number of different directions. In particular, the use of directional antenna can also make it possible to search for candidate base stations in a number of different directions simultaneously.

Figure 5:
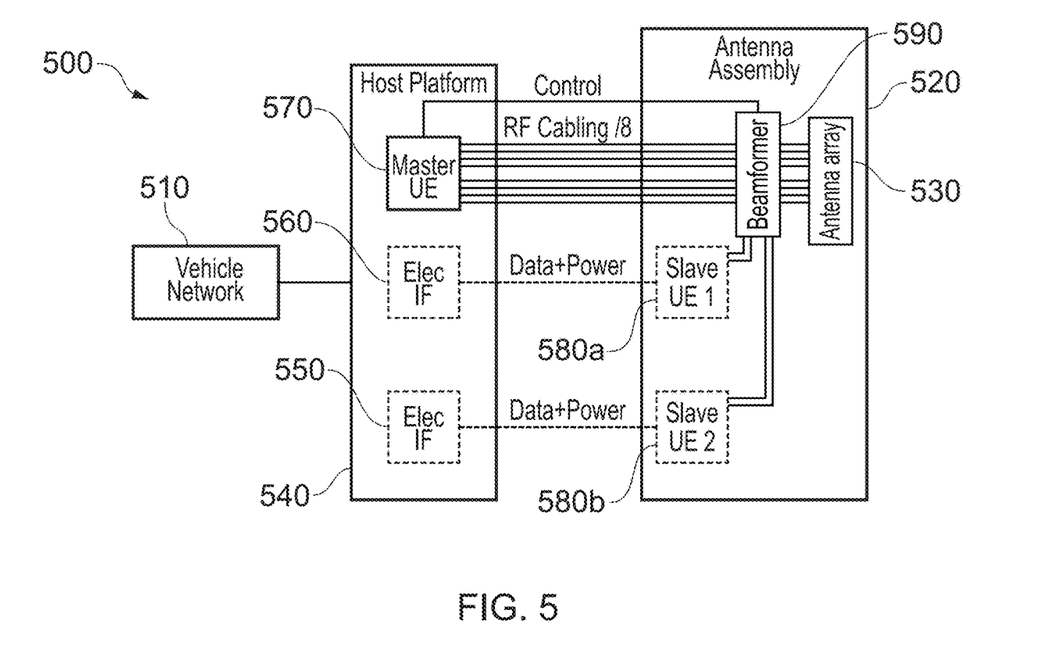
FIG. 5 schematically illustrates embodiments that make use of beamforming.

FIG. 5 schematically illustrates embodiments that make use of beamforming. Beamforming is a technique in which the use of constructive interference produced from multiple signals can be used to increase the power of those signals. In this example, a beamformer 590 manages the signals received/transmitted using the antenna array 530 so as to perform beamforming. The RF signals to and from the modems 570, 580a, 580b are therefore passed to the antenna array 530 via the beamformer 590. The beamformer 590 is also controlled by the master modem 570 in the host platform 540. The master modem 570 is connected to the beamformer 590 via analog cables. In contrast, the slave modems 580a, 580b form part of the antenna assembly 520 and are connected to the host platform 540 via digital cables. Again, the host platform is connected to a vehicle network 510.

Figure 6:
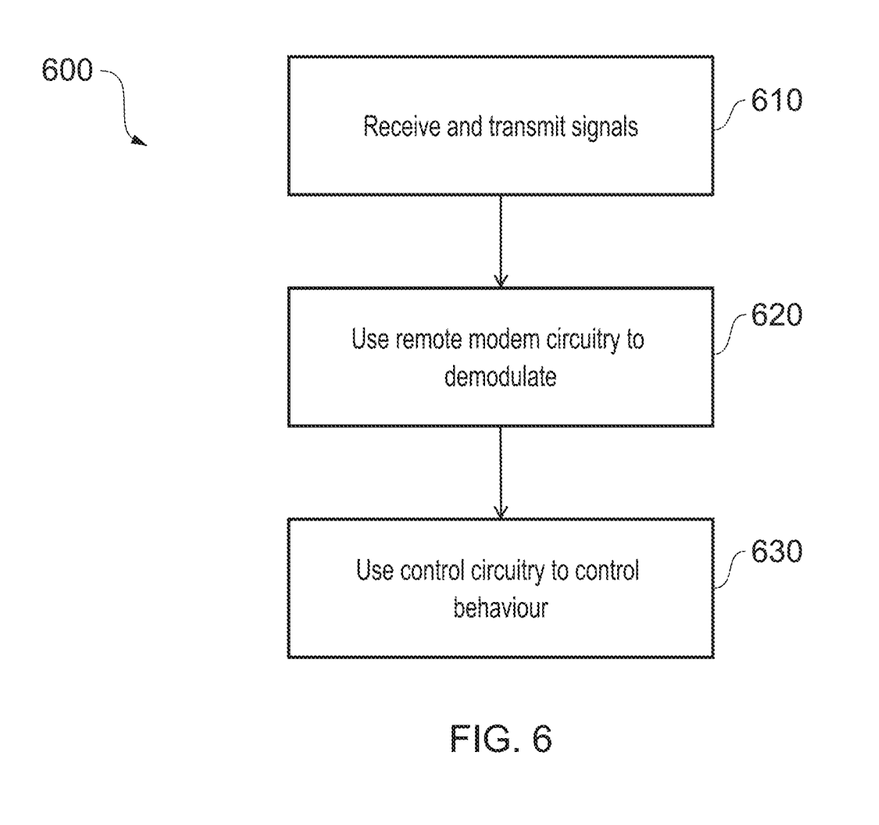
FIG. 6 illustrates a flowchart in accordance with some embodiments.

FIG. 6 illustrates a flowchart 600 in accordance with some embodiments. At a step 610, signals are received and transmitted via antenna circuitry. At a step 620, remote modem circuitry which is connected to the antenna circuitry via analog cables, demodulates one of the incoming signals received by the antenna circuitry. The demodulation process produces incoming data. At a step 630, control circuitry is used. The control circuitry (e.g. a host platform) is distant from the remote modem circuitry and is connected via digital cabling. A behaviour of the remote modem circuitry can be controlled by the control circuitry and the incoming data can be provided from the remote modem circuitry to the control circuitry via the digital cabling.

Figure 7:
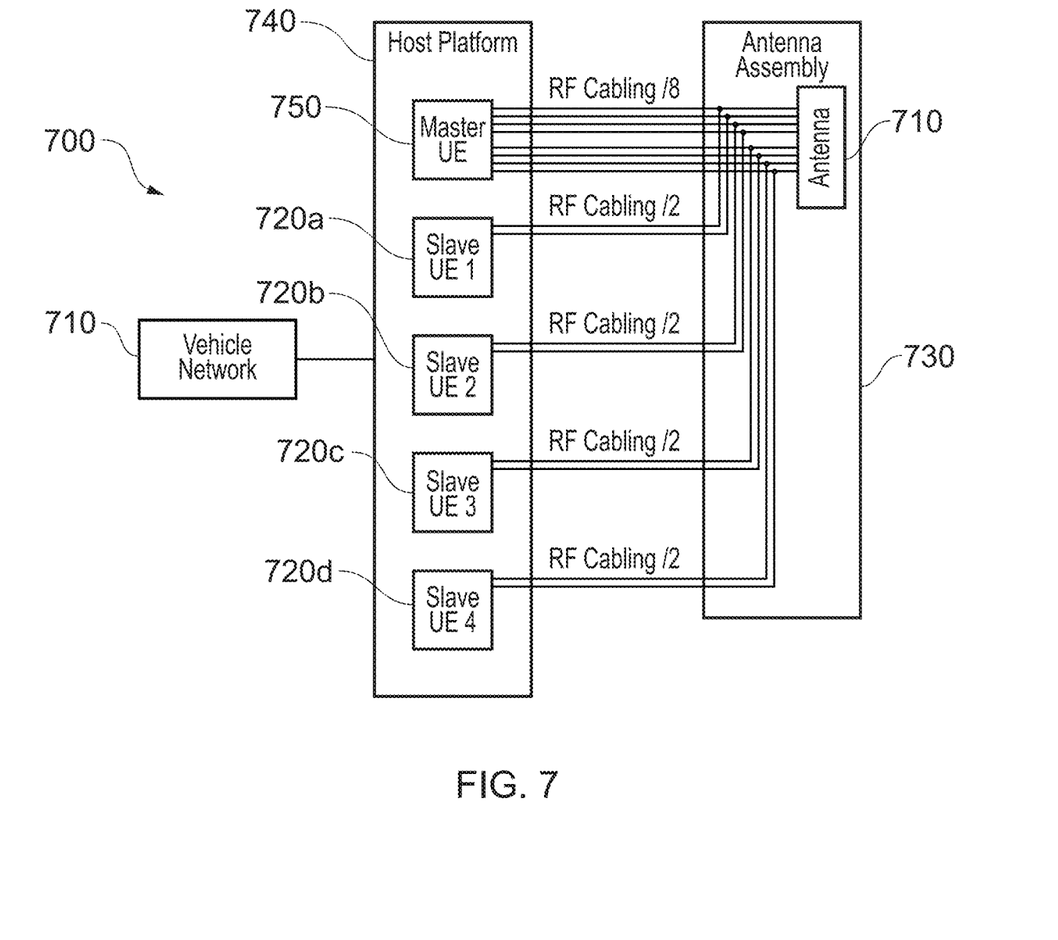
FIG. 7 schematically illustrates an example apparatus in accordance with some embodiments.

FIG. 7 schematically illustrates an example apparatus 700 in accordance with some embodiments. The apparatus includes an antenna assembly 730, including an antenna 710. A master modem 750 is provided, together with a set of slave modems 720b, 720c, 720d, 720e. The master modem 750 is capable of modulating and demodulating and thus can both receive and transmit signals using the antenna 710. Accordingly, the master modem 750 is connected to the antenna 710 by eight analog cables. In contrast, each of the four slave modems 720a, 720b, 720c, 720d is connected to the antenna 710 by two analog cables and is only capable of reception (e.g. demodulating incoming signals). The host platform is connected to a vehicle network 710.

In this example, each of the slave modems 720a, 720b, 720c, 720d is able to receive and demodulate incoming signals coming from different base stations. In response to determining a 'better' signal (e.g. a more appropriate base station to connect to), the host platform (e.g. switching circuitry) 740 causes the master modem 750 to connect to that 'better' base station. In this way, the master modem 750 is able to maintain its connection. In other words, it need not keep disconnecting from the current base station to look for, and analyse the signal quality of, other base stations. However, by virtue of the slave modems 720a, 720b, 720c, 720d, such better connections can be located.

As illustrated with respect to, for instance, FIG. 3A, such a network can be implemented by placing one or more slave modems 314a, 314b, 314c, 314d in the vicinity of the antenna assembly, and connecting those slave modems 314a, 314b, 314c, 314d to electronic interfaces 312a, 312b, 312c, 312d of the host platform 310 (which in this example acts as switching circuitry) using digital cabling. Consequently, the above can be achieved while further reducing the need for extensive analog cabling.

Figure 8:
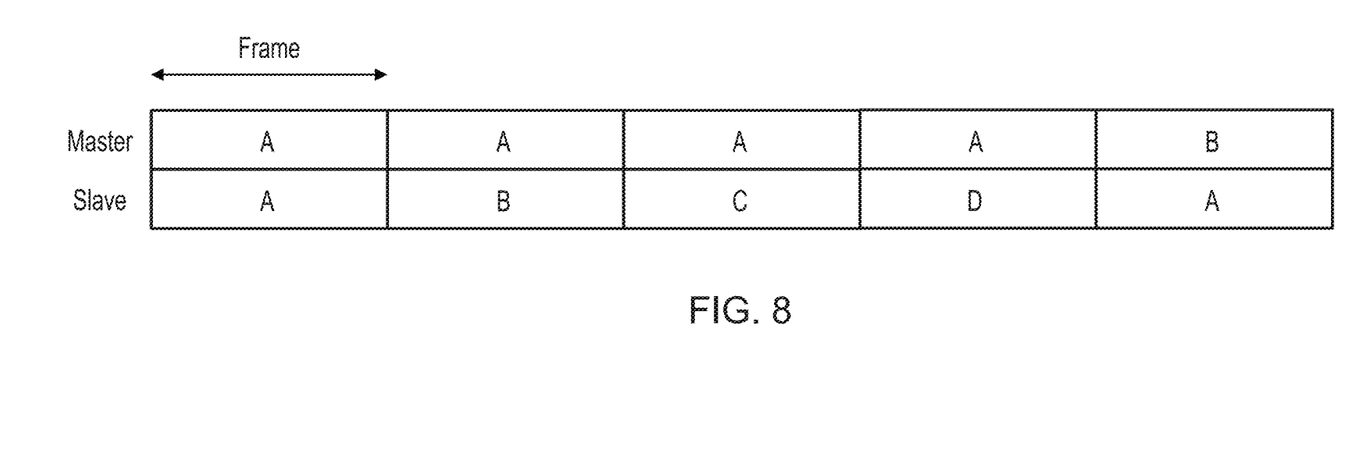
FIG. 8 illustrates the connectivity that occurs in such a network at a master and a slave in accordance with some embodiments.
Figure 9:
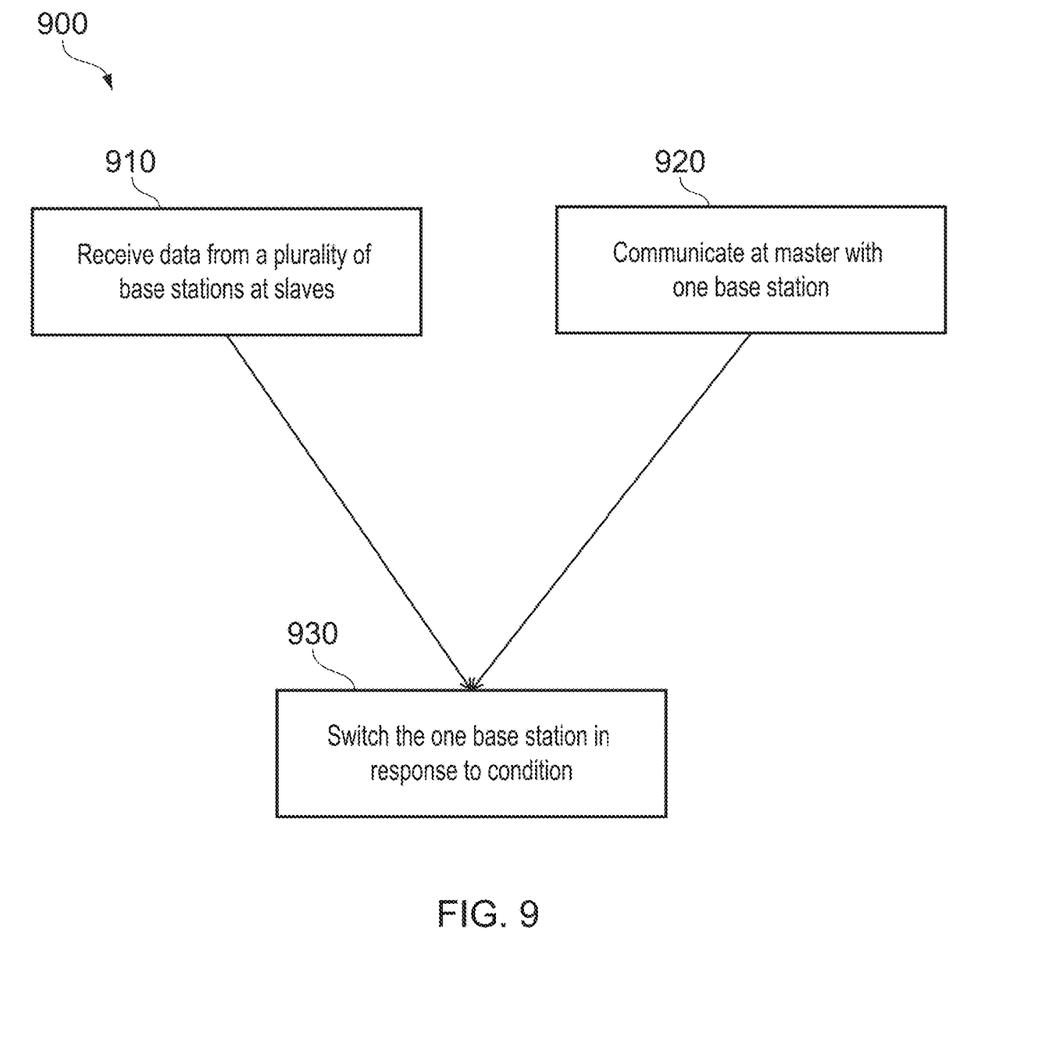
FIG. 9 shows a flowchart that illustrates a method according to some embodiments.

FIG. 8 illustrates the connectivity that occurs in such a network at a master and a slave in accordance with some embodiments. In the example of FIG. 9, five frames are shown. For the first four frames, the master remains connected to a first base station (A). That is to say that the master actively exchanges information with the first base station. During these same four frames, the slave modem receives data not only from the first base station (A) but in the second, third, and fourth frames, also from a second base station (B), third base station (C) and four base station (D). At this point, the switching circuitry determines that the signal produced by the second base station (B) is "better" than the signal produced by the first base station (A). The signal might, for instance, have a higher SINR. Consequently, the master directly changes its connection to the second base station (B). The master is therefore able to maintain a connection without having to spend frames searching for other signals (during which connectivity with the currently selected base station is not possible). This is achieved by the slave or slaves receiving and demodulating other signals that are analysed to determine which base station a connection should be formed with. Note that in the fifth frame, the master is connected to the second base station (B) but the slave cycles around again to receive a signal generated by the first base station (A). This is so that scanning can be continually performed to take advantage of changes in signal strength (e.g. as the result of movement of the vehicle).

FIG. 9 shows a flowchart 900 that illustrates a method according to some embodiments. At a step 910, data is received (during a plurality of frames) from a plurality of base stations at slave modem circuitry. At the same time (e.g. during that same plurality of frames) the master modem circuitry maintains a connection with one of those base stations. At a step 930, switching circuitry causes the master modem circuitry to switch to one of the other base stations. The trigger for causing the switching circuitry could be after a period of time, or could be when a significantly better base station (signal) is encountered (e.g. better than the current base station by a given threshold). In some embodiments, regardless of the trigger, the switch is only made once all currently known base station signals have been analysed. Other triggers are, of course, possible.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A network comprising:
    antenna circuitry configured to receive incoming signals from a base station and transmit outgoing signals;
    remote modem circuitry connected to the antenna circuitry by analog cabling, the remote modem circuitry being configured to demodulate a first incoming signal of the incoming signals, as received by the antenna circuitry, to produce first incoming data; and
    control circuitry that is remote from the remote modem circuitry and is connected to the remote modem circuitry via digital cabling, the control circuitry being configured to determine whether to control the remote modem circuitry to receive data from a different base station and to receive the first incoming data from the remote modem circuitry,
    wherein the network is configured to be split across a boundary of a vehicle such that the control circuitry is internal to the vehicle and the remote modem circuitry is external to the vehicle,. and
    wherein the network further includes:
        further modem circuitry configured to demodulate a second incoming signal of the incoming signals to produce second incoming data and to provide the second incoming data to the control circuitry, wherein the control circuitry is adapted to determine whether to control the further modem circuitry to receive data from a different base station; and
        beamforming circuitry configured to perform beamforming using the remote modem circuitry and the further modem circuitry.

2. The network according to claim 1, wherein the remote modem circuitry is nearer to the antenna circuitry than the control circuitry.

3. The network according to claim 1, wherein a length of the analog cabling is less than a length of the digital cabling.

4. The network according to claim 1, wherein the remote modem circuitry is adapted to modulate outgoing data to produce a first outgoing signal of the outgoing signals.

5. The network according to claim 1, wherein the further modem circuitry is adapted to modulate second outgoing data to produce a second outgoing signal of the outgoing signals.

6. The network according to claim 1, wherein the control circuitry comprises the further modem circuitry.

7. The network according to claim 1, wherein:
    the further modem circuitry is further remote modem circuitry; and
    the further remote modem circuitry is nearer to the antenna circuitry than the control circuitry.

8. The network according to claim 1, wherein:
the antenna circuitry comprises a first antenna array and a second antenna array;
the remote modem circuitry is connected to the first antenna array; and
the further modem circuitry is connected to the second antenna array.

9. The network according to claim 1, wherein:
the first incoming signal originates from a first base station;
the second incoming signal originates from a second base station;
the control circuitry is adapted to perform a comparison between the first incoming signal and the second incoming signal; and
the control circuitry is adapted to cause the remote modem circuitry to communicate with the second base station in place of the first base station in dependence on a result of the comparison.

10. The network according to claim 9, wherein the comparison considers a signal strength of the first incoming signal and a signal strength of the second incoming signal.

11. The network according to claim 9, wherein the comparison considers a change in a signal strength of the first incoming signal and a change in a signal strength of the second incoming signal.

12. A vehicle comprising the network of claim 1, wherein:
the antenna circuitry is external to the vehicle; and
the control circuitry is internal to the vehicle.

13. The vehicle according to claim 12, wherein the remote modem circuitry is external to the vehicle.

14. A method comprising:
receiving incoming signals from a base station and transmitting outgoing signals via antenna circuitry;
using remote modem circuitry, connected to the antenna circuitry by analog cabling, to demodulate a first incoming signal of the incoming signals, as received by the antenna circuitry, to produce first incoming data;
using control circuitry that is remote from the remote modem circuitry and is connected to the remote modem circuitry via digital cabling to determine whether to control the remote modem circuitry to receive data from a different base station and to receive the first incoming data from the remote modem circuitry; and
using the control circuitry to determine whether to control the remote modem circuitry to receive data from a different base station,
wherein the control circuitry is internal to a vehicle and the remote modem circuitry is external to the vehicle, and
wherein the method further includes:
using further modem circuitry to demodulate a second incoming signal of the incoming signals to produce second incoming data and to provide the second incoming data to the control circuitry;
using the control circuitry to determine whether to control the further modem circuitry to receive data from a different base station; and
using beamforming circuitry to perform beamforming using the remote modem circuitry and the further modem circuitry.

\* \* \* \* \*